Figure 1:
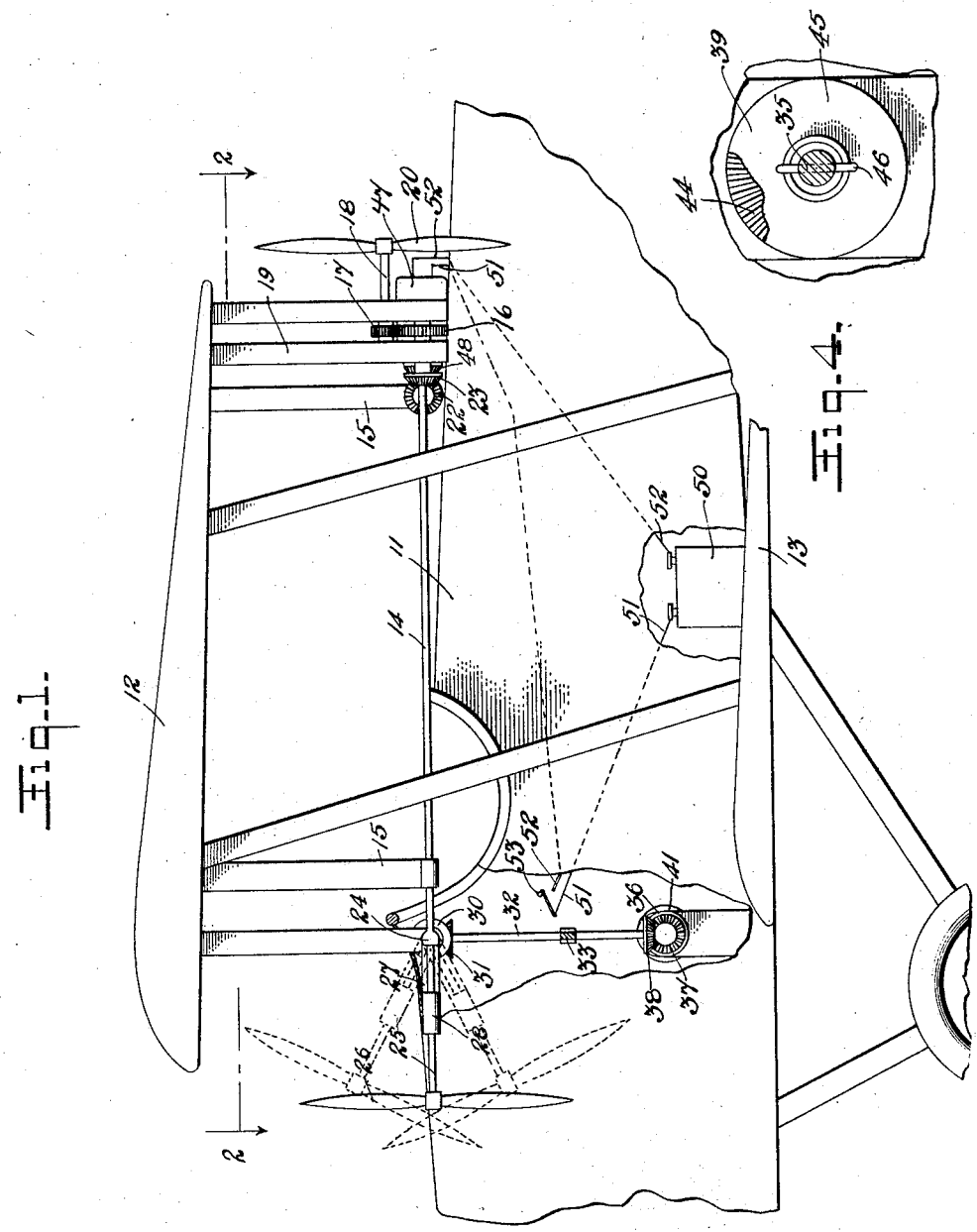

March 22, 1932.  A. ALTIERI  1,850,066
AUXILIARY PROPELLER FOR AIRCRAFT
Filed April 18, 1931   2 Sheets-Sheet 1

WITNESS:

INVENTOR
Alexander Altieri
BY
HIS ATTORNEY

March 22, 1932.   A. ALTIERI   1,850,066
AUXILIARY PROPELLER FOR AIRCRAFT
Filed April 18, 1931   2 Sheets-Sheet 2

WITNESS:

INVENTOR
Alexander Altieri
BY
Joshua R. H. Potts
HIS ATTORNEY

Patented Mar. 22, 1932

1,850,066

UNITED STATES PATENT OFFICE

ALEXANDER ALTIERI, OF PHILADELPHIA, PENNSYLVANIA

AUXILIARY PROPELLER FOR AIRCRAFT

Application filed April 18, 1931. Serial No. 531,020.

This invention relates to auxiliary propellers for aircraft, and has for an object to provide improved means which will be normally operated by the thrust of the air passing under a wing against a wind wheel, and through the necessary transmission mechanism operating an auxiliary propeller which is adjustable as to its axis.

A further object of the invention is to provide an auxiliary propelling means which is further characterized by an independent drive, normally idle which may be employed to the propelling means when found necessary or desirable.

A further object of the invention is to provide an auxiliary propelling means having auxiliary propellers fore and aft of the wings, the former being adjustable relative to the horizontal plane of the craft and to the axial alinement of the aft propeller.

The invention, therefore, comprises propellers spaced substantially at the fore and aft edges of the wings, the latter receiving thrust from the air passing under the wing, with means to adjust the axis of rotation of the forward propeller, and a motor normally idle and normally out of gear with said auxiliary propeller which automatically intergears therewith upon excitement.

Figure 2:
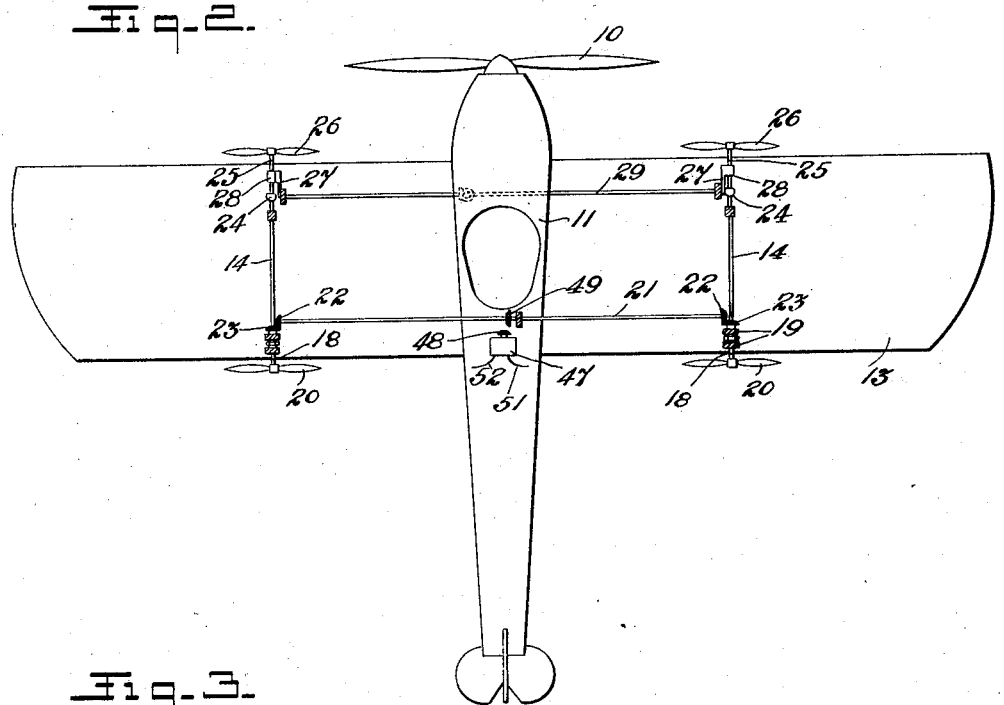
Figure 3:
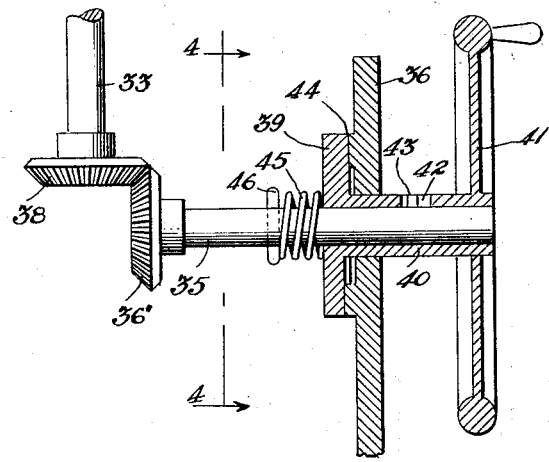

In the drawings:

Figure 1 is a view in side elevation of the invention applied to a conventional type of air craft, parts of which are broken away to illustrate the association of the invention therewith, Figure 2 is a plan view of the invention with the top wing broken away and parts of the supporting structure shown in section, Figure 3 is an enlarged detail view of a means for tilting the forward propeller, and Figure 4 is a sectional view taken on line 4—4 of Figure 3.

Like characters of reference indicate corresponding parts throughout the several views.

The auxiliary propeller, which forms the subject matter of this application, is adapted for auxiliary action with a main propeller 10, of the usual type, carried upon the fuselage 11, with wings 12 and 13 which may be of any chosen design, and the disclosure of the drawing is no limitation.

Extending from the fore to aft of the under-wing area is a shaft 14, one being properly provided upon each side of the fuselage as shown more particularly at Figure 2. This shaft is supported in any type of bearings conventionally indicated at 15. Adjacent its aft extremity, it is provided with a gear 16 intermeshed with a pinion 17 upon a shaft 18. The shaft 18 is also mounted in bearing 19, and carries a propeller 20 which will preferably be located just beneath the rear edge of the upper wing 12 to receive the thrust from the air passing under said wing in flight.

The two shafts 14 as shown at Figure 2, are interconnected by means of a shaft 21 extending transversely of the fuselage, and provided with bevelled gears 22, intermeshing with bevelled gears 23 upon the shaft 14 so that both of these shafts operate in synchronism.

At the forward end of the shaft 14, a universal joint 24 is provided and extended by means of a shaft 25, the alinement of which with the shaft 14 may be varied through the instrumentality of the universal joint in the usual well known manner. This shaft 25 carries a propeller 26 which is preferably lower than the propeller 20 as indicated at Figure 1.

Also, the propellers 26 are made adjustable relative to the shaft 14, and through the medium of the universal joint by means of arms 27 having bearings 28 journalling the said shaft 25. These arms 27 are rigidly secured to a shaft 29 which extends transversely relative to the fuselage, as shown at Figure 2, so that both of the arms 27 are adjusted simultaneously providing simultaneous and similar adjustment of the propellers 26.

Any approved means may be employed for oscillating the shaft 29. As shown in the drawings, the shaft 29 is provided with a bevelled gear 30 intermeshing with the gear 31, carried upon a shaft 32 vertically journaled as at 33.

Within the cockpit, or otherwise conventionally located, a hand control means is provided. This is shown more particularly at Figures 3 and 4 and comprises a shaft 35 journaled in any conveniently arranged upright 36 and carrying a beveled gear 36' intermeshing with the beveled gear 38 upon the shaft 33. It is obvious that the rotation of this shaft 35 will rotate the shaft 33, which in turn will oscillate the shaft 29 and therefore, the arms 27 and therewith, the shafts 25 and propellers 26. A control is shown comprising a disk 39 carried upon a sleeve 40 which is provided with a hand wheel 41. The sleeve 40, disk 39 and hand wheels 41 slide relative to the shaft 35, the sleeve being provided with a slot 42, and the shaft with a pin 43 to permit such sliding movement, but prevent rotation. The disk 39 and support 36 are rosetted as indicated at 44, and the rosette members are held in engagement by a spring 45 bearing at one end against the disk 39, and at the opposite end against a pin 46 in the shaft 35.

As an auxiliary driving means, a motor shown conventionally at 47 is employed having a gear 48 which may at times intermesh with a gear 49 carried upon the shaft 21. This motor 47 is of the usual type referred to as a "Bendix starter" wherein, when the motor is energized, the gear 48 will move toward into engagement with the gear 49 and will maintain such position so long as the driven parts resist driving from the motor.

As soon as such resistance is overcome, the gears move backward into their inactive and idle position. No attempt has been made to show this type of motor specifically as it is a well known type and is merely employed in this position where it is coupled with the battery 50, through the conductors 51 and 52, a manual switch being located within the cockpit or elsewhere convenient to the operator for closing the circuit and thereby energizing the motor.

When and if the principal propelling means, represented by the propeller 10 shall fail, and a forced landing must be made, it is often desirable to have some available propelling power supplemental to the affects acquired from gliding. In effecting such forced landing, it will, of course, not be necessary to operate the auxiliary propellers until such time as additional propulsion seems necessary or desirable. When this contingency arises, the manual switch 53 is closed, and the motor 47 automatically interconnected with the auxiliary propelling means in the manner well known in such type of motors. Such additional or supplemental propulsion, though of no great effect, will many times be sufficient additional power to effect a proper and safe landing.

For further assisting in landing, when the auxiliary propelling means is employed, the forward propellers 26, by the means described, may be adjusted to any angular position, the condition of flying or landing seems to make necessary or desirable.

At other times, when the motor 47 is disconnected from the propelling means, and remains idle, the thrust of the air passing under the top wing 12 against the wind wheel 20 will, through the gearing and transmission mechanism shown, be applied to the forward propeller 26, and by the angular adjustment of this forward propeller, transmitted into such angular stresses as occasion may make necessary or desirable.

Of course, the auxiliary propeller for aircraft, herein illustrated, may be modified in various ways without departing from the invention herein set forth and hereinafter claimed.

The invention is hereby claimed as follows:

1. The combination with an aircraft embodying oppositely extended wings, auxiliary propellers located adjacent the lower rear edge of the wings, other propellers located forwardly of the wings, means transmitting power from the aft propeller to the forward propeller, and means for adjusting the forward propeller angularly relative to the axis of the aft propeller.

2. The combination with an aircraft embodying oppositely extended wings, propellers mounted under said wings adjacent to the aft edge, propellers journaled forwardly of the wings, transmission mechanism transmitting power from said aft propellers to said forward propellers, universal joints in said transmitting mechanisms, and means to adjust the axes of said forward propellers in vertical plane angularly relative to the axis of the aft propellers.

3. The combination with an aircraft embodying oppositely extended wings and a propeller, auxiliary propellers disposed upon opposite sides of the craft and relative to the oppositely extended wings, means interconnecting said auxiliary propellers to operate synchronously, and a motor for driving said auxiliary propellers, said motors being normally idle and disconnected therefrom and adapted for co-action therewith when energized.

4. The combination with an aircraft embodying oppositely extended wings, fore and aft propellers mounted beneath the plane of an upper wing, means interconnecting the fore and aft propellers, means interconnecting the propellers of said oppositely extended wings, a motor driving said last interconnecting means, said motor being normally idle and out of engagement with said interconnecting means, and adapted to interconnect operatively therewith when energized.

In testimony whereof I have signed my name to this specification.

ALEXANDER ALTIERI.